June 21, 1966 Z. MONDAY 3,256,715
NARROWING AND WIDENING APPARATUS AND METHOD
FOR KNITTING MACHINES
Filed July 11, 1962 6 Sheets-Sheet 2
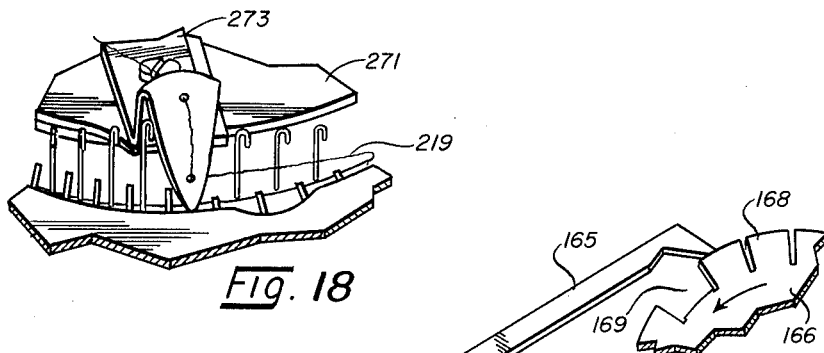
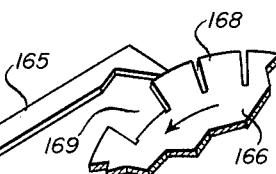
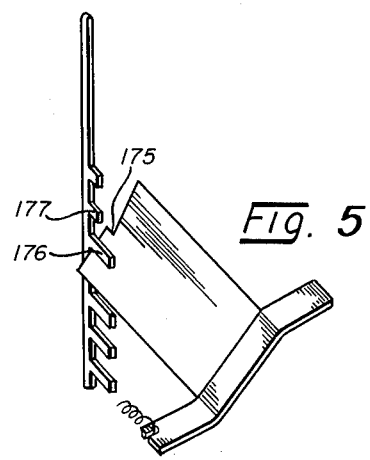
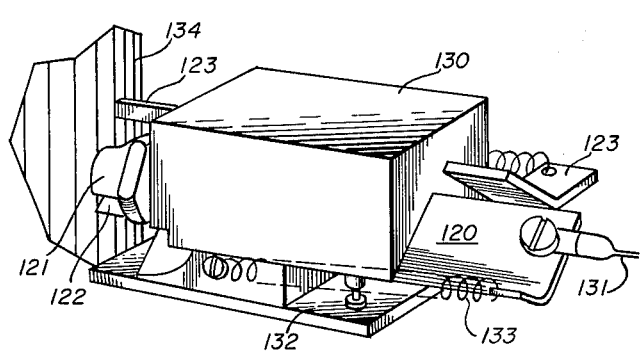
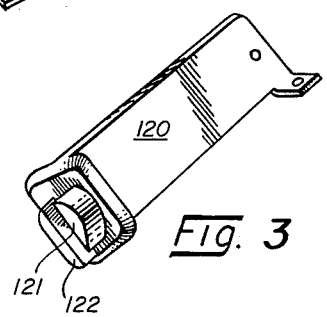
INVENTOR.
Zephyr Monday
BY
B. B. Olin
ATTORNEY

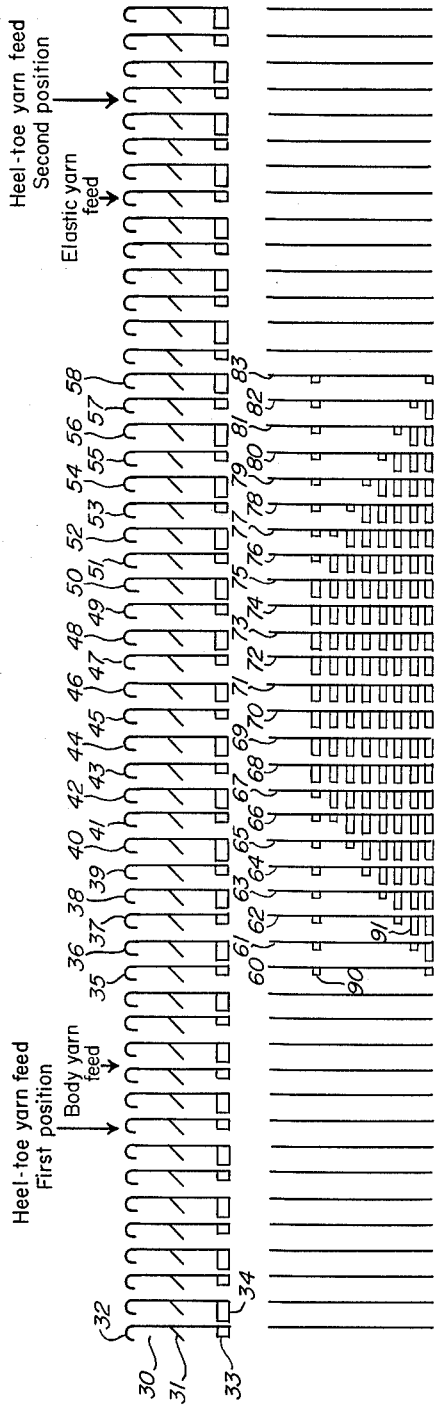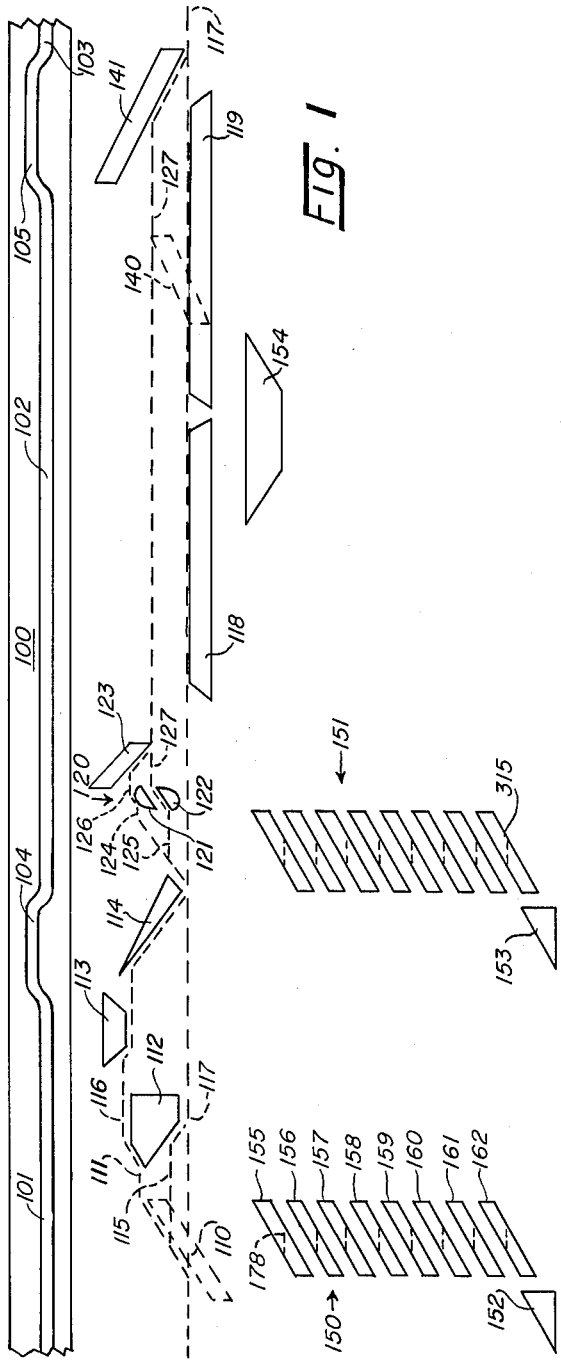
Fig. 1
INVENTOR.
Zephyr Monday

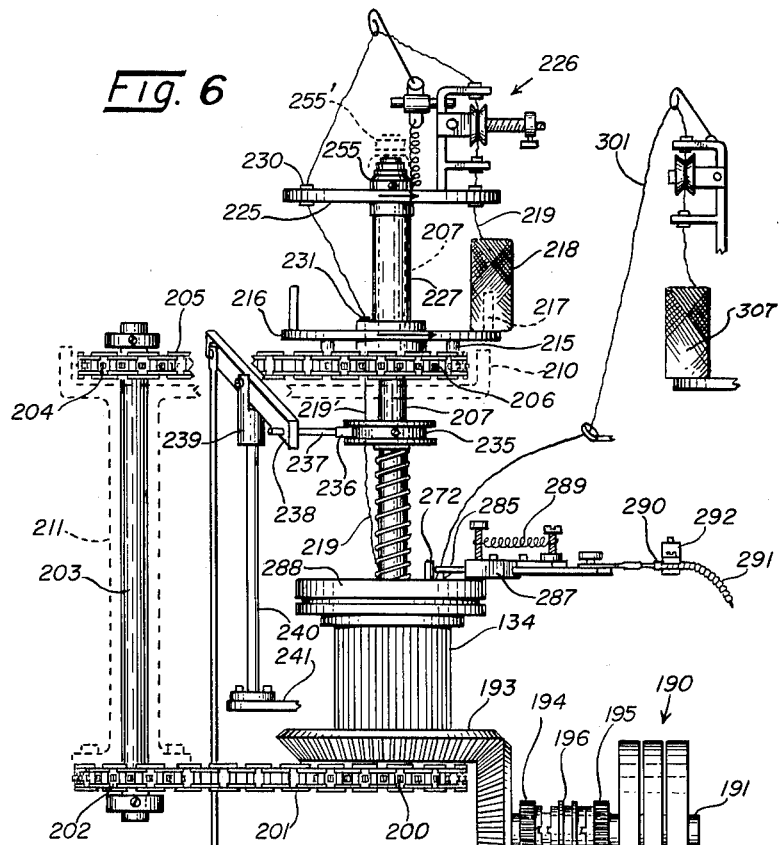

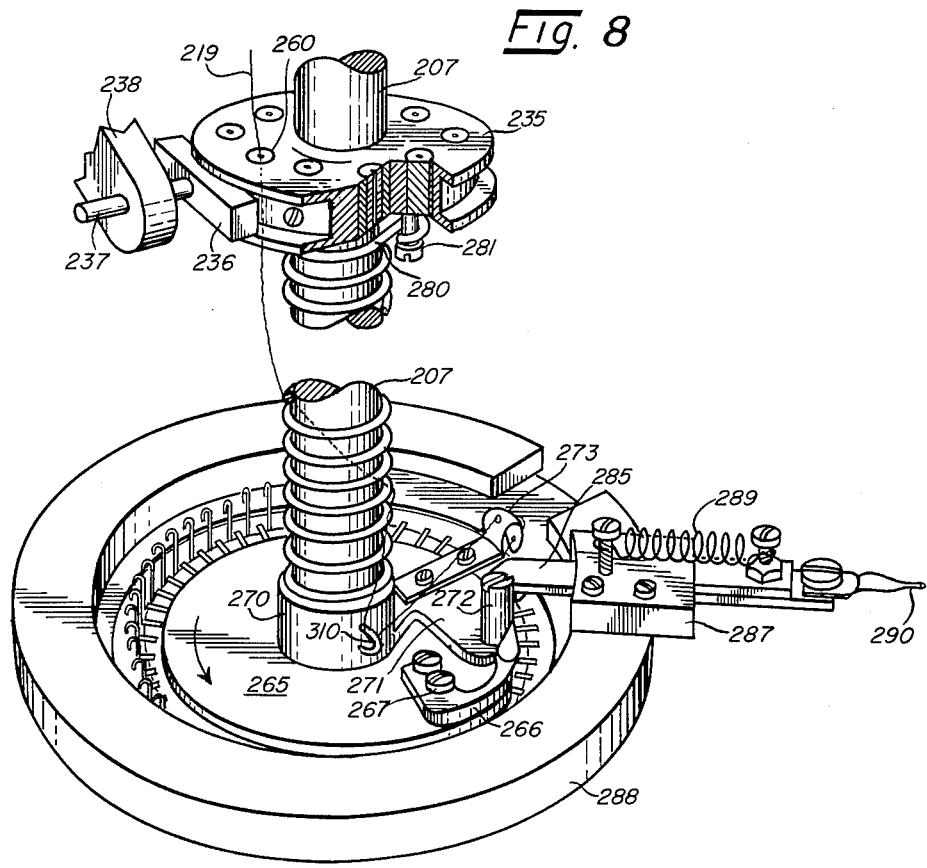
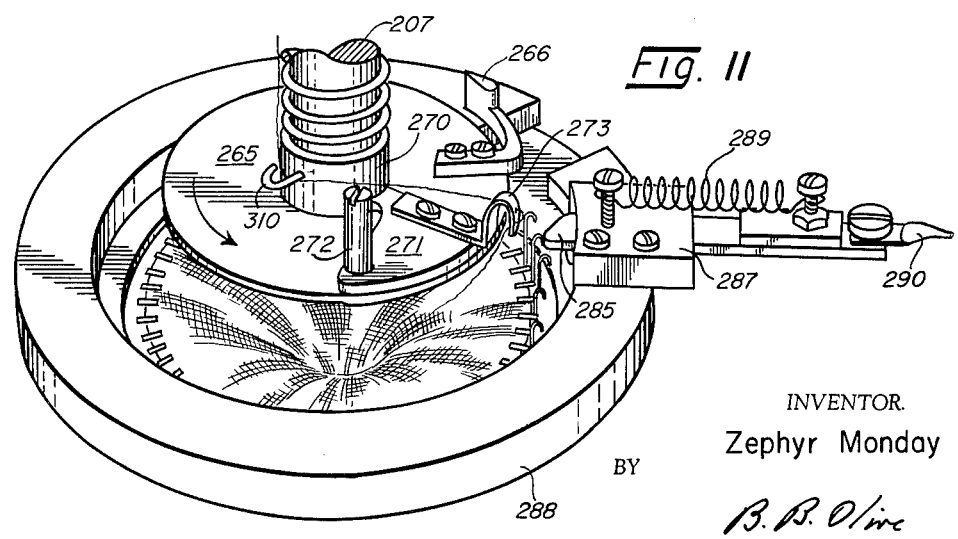
INVENTOR.
Zephyr Monday
BY
B. B. Olive
ATTORNEY

June 21, 1966  Z. MONDAY  3,256,715
NARROWING AND WIDENING APPARATUS AND METHOD
FOR KNITTING MACHINES
Filed July 11, 1962  6 Sheets-Sheet 5
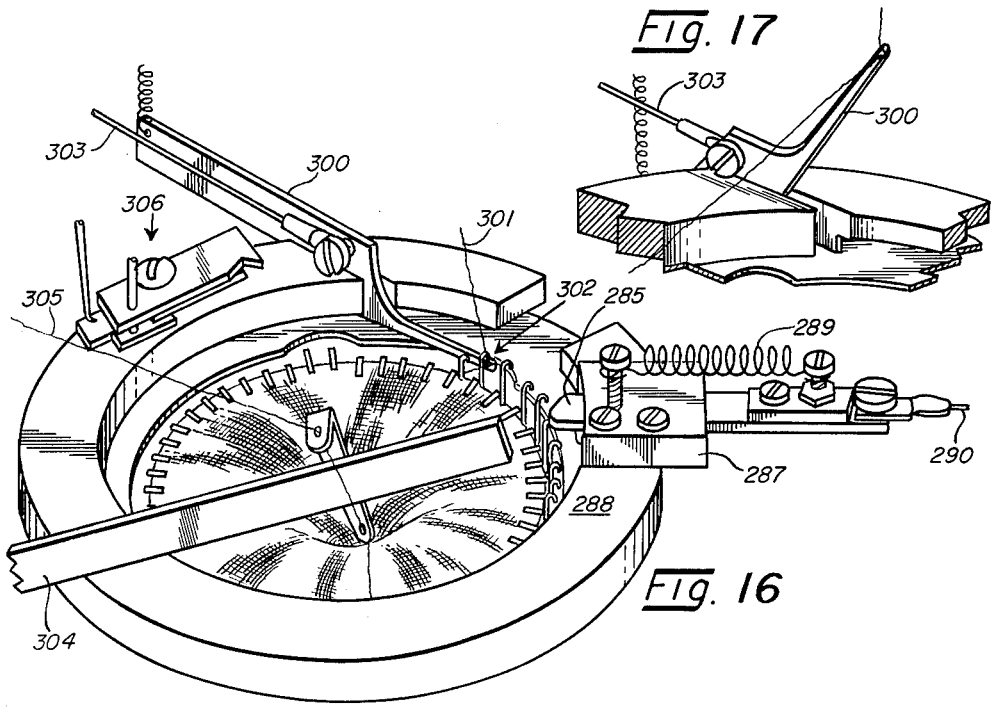
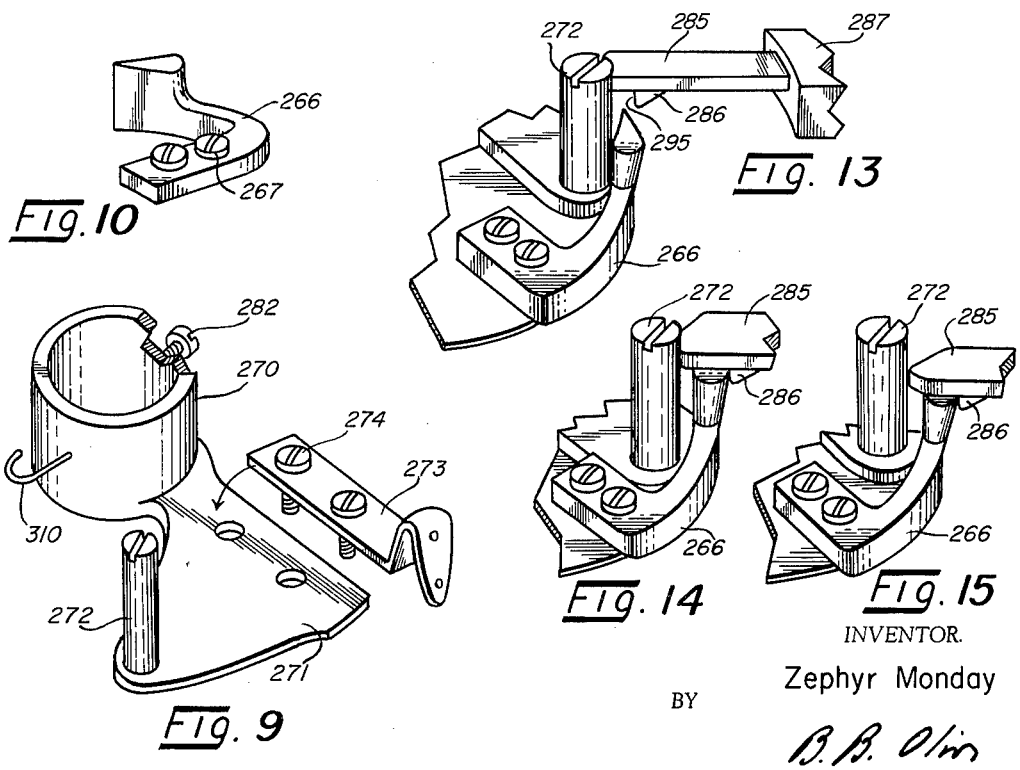
INVENTOR.
Zephyr Monday
BY
*B. B. Olin*
ATTORNEY June 21, 1966  Z. MONDAY  3,256,715
NARROWING AND WIDENING APPARATUS AND METHOD
FOR KNITTING MACHINES
Filed July 11, 1962  6 Sheets-Sheet 6

INVENTOR.
Zephyr Monday
BY
B. B. Olin
ATTORNEY

United States Patent Office 3,256,715
Patented June 21, 1966

3,256,715
NARROWING AND WIDENING APPARATUS AND METHOD FOR KNITTING MACHINES
Zephyr Monday, Mount Airy, N.C., assignor to U-Stretch Corporation, Mount Airy, N.C., a corporation of North Carolina
Filed July 11, 1962, Ser. No. 209,150
20 Claims. (Cl. 66—46)

This invention is concerned with apparatus and method for narrowing and widening the fabric in a circular knitting machine. The invention is further concerned with apparatus and method useful in a circular knitting machine and which allows the same yarn to be fed and knit at a plurality of points in each rotation of the needle cylinder. The invention is more specifically concerned with apparatus and method useful in knitting sock heel and toe constructions.

In the conventional circular knitting apparatus and methods most frequently employed for narrowing and widening there is employed gearing and related clutch mechanism which puts the cylinder into a reciprocatory motion during the narrowing and widening process. Through use of widening and narrowing picks, switch cams and related mechanism the narrowing and widening is effected but at relatively low knitting speed. Reference to the conventional system may be found in Patent 2,217,022. It has been previously proposed to effect narrowing and widening by methods and apparatus which would allow the cylinder to rotate rather than oscillate during the narrowing and widening. However, so far as I am aware all such methods have in one way or another required the formation of extensive floated threads as exemplified for example in Patent 1,460,477.

The present invention has as an object the provision of method and apparatus which enables narrowing and widening operations to be performed on a circular knitting machine while maintaining the needle cylinder in continuous rotation.

Another object is to provide method and apparatus which enables narrowing and widening operations to be performed on a circular knitting machine without use of switch cams, needle picks, clutch apparatus and the like.

A further object is to provide method and apparatus for a circular knitting machine which enables the same yarn to be fed and knit into the fabric at a plurality of feeding and knitting points during each rotation of the cylinder.

A further object is to provide a novel rotating yarn feed for a circular knitting machine which enables the same yarn to be fed at one knitting point for a predetermined time and then be fed at another knitting point and then be returned to the first point all during each rotation of the needle cylinder.

Another object is to provide method and apparatus for a circular knitting machine which enables selected needles to receive and knit the same yarn at a plurality of points during each rotation of the cylinder.

Another object is to utilize jack butt selectors as a means for dropping and adding needles during the narrowing and widening process in knitting socks.

Another object is to provide a method of narrowing and widening in circular hosiery machine knitting which allows the cylinder to rotate during the narrowing and widening but which does not require the formation of floats in the fabric where the narrowing and widening is effected.

These and other objects of the invention will appear as the description proceeds and in the drawings, in which:

FIGURE 1 is a diagrammatic view showing the needles and needle butts, the jacks and jack butts, the sinker cam, the needle butt cams, the jack butt selectors and jack butt cams.

FIGURE 2 is an enlarged perspective of a special needle butt cam block and cams used in the invention.

FIGURE 3 is an enlarged perspective of one of the cams shown in FIGURE 2.

FIGURE 4 is a perspective somewhat schematic view showing a jack butt selector cam and its control.

FIGURE 5 is a perspective detail showing how long and short jack butt selection is effected by the jack butt selector cam.

FIGURE 6 is a front elevation somewhat schematic view of the main elements of a machine employing the invention with the machine frame and other elements not directly pertinent being eliminated for the sake of clarity.

FIGURE 7 is a perspective detail showing the drum control employed to lift and lower the special heel-toe yarn feed assembly.

FIGURE 8 is an enlarged partially cut-away perspective detail of the heel-toe yarn feed assembly in engaged position.

FIGURE 9 is an enlarged perspective detail of the heel-toe yarn feed guide and its mounting hub.

FIGURE 10 is an enlarged perspective detail of a release arm used in the invention.

FIGURE 11 is an enlarged perspective detail similar to the lower part of FIGURE 8 but with the heel-toe yarn feed assembly disengaged.

FIGURE 12 is similar to FIGURE 7 and is a perspective detail showing the drum control employed to control rotation of the hub assembly of FIGURE 9.

FIGURES 13, 14 and 15 are perspective enlarged details showing how the hub assembly of FIGURE 9 is released for rotation.

FIGURE 16 is an enlarged perspective detail of the conventional yarn feed employed with the invention and with the heel-toe yarn feed assembly removed in order to see the conventional feed.

FIGURE 17 is a further enlarged perspective detail of the conventional yarn feed.

FIGURE 18 is an enlarged fragmentary perspective detail showing how the needles appear as they receive yarn from the heel-toe yarn feed guide in its first position.

Figure 20:
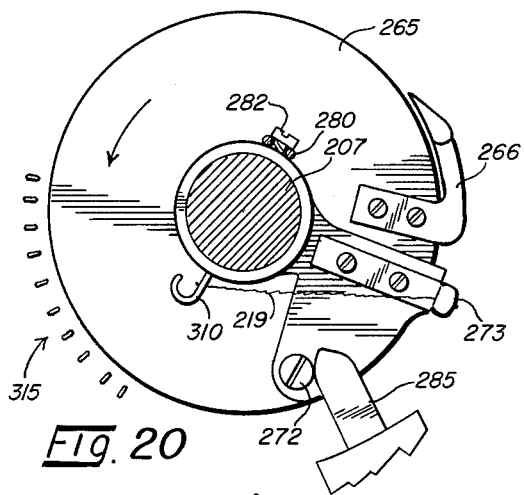
FIGURES 20 through 24 show in plan view successive rotative steps of the elements involved in the heel-toe yarn feed assembly.

To generally summarize the invention, when either the heel or toe is reached the needles are divided into two groups. The needles in one group are made inactive while the needles in the other group remain active. Those needles which are made inactive represent needles which hold the stitches, such as the instep stitches, during formation of the respective heel or toe while the active needles represent those needles used in narrowing and widening. The needles in the active group are made to take yarn at a first feed point and are then passed through stitching and shedding cams. The yarn being mentioned is a yarn which is fed to the needles through a unique yarn feed device during the narrowing and widening, the regular body yarn being preferably withdrawn during such time. As the trailing needle in the active group leaves the first shedding cams, the special yarn feed device is arranged so that it can be moved around almost instantaneously and at a speed exceeding the speed of the cylinder to a second feed point located ahead of the leading needle of the group. In doing so, the same yarn is cast on the hooks of all the needles in the active group. As the needles continue to move with this last mentioned yarn under their hooks, they pass through a second set of stitches and shedding cams and then return to the first feed point. Thus in each rotation of the cylinder the active needles will have received the same yarn at two separate points and will have knit in this yarn at both points. The passing of the needles through each point results, in effect, in knitting one course so that two courses are knit on each rotation.

When the leading needle of the active knitting group has returned to the first feed point, the special yarn feed device is arranged so that its rotative movement brings it back to its original position at the first feed point and makes it ready to serve the same yarn once again to the active needles. The needles again receive yarn at the first feed point and thereafter go through the first stitch and shedding cams and then again receive yarn at the second feed point and thereafter go through the second stitch and shedding cams. However, in repeating the cycle of knitting as described, one or more needles may be dropped from or added to the active group by means of jack butt selection at either one or both of the knitting points resulting in the fabric being narrowed or widened to the extent that needles are dropped or added. The needles dropped become part of the inactive stitch holding group. On the next sequence through the two knitting stations, needles may again be dropped or added before either or both points and in the same manner in subsequent sequences. By dropping needles before each knitting point until the fabric is down to some desired number of needles followed by the addition of needles back to the original number, narrowing and widening can be accomplished solely by jack butt selection.

It seems important that the reader should recognize that the described knitting sequence takes place with continuous rotation of the cylinder and that the same yarn is knit twice into the heel or toe portion as the case may be on each rotation of the cylinder. Thus, the method and apparatus of the invention provides a means of relatively fast widening and narrowing which does not require the rigorous and relatively slow oscillating apparatus normally encountered.

Looking now to the invention in more detail, reference will be made to the drawings in which the invention is shown applied to a coarse gauge fifty-two latch needle, sinker equipped circular knitting machine generally of the Banner type and as might be employed for example in knitting children's bobby socks. It should be understood that the invention is applicable to many types of circular knitting machines and that this example is merely illustrative of the many applications of the invention which will undoubtedly become apparent to those skilled in the art. While particularly applicable to heel and toe knitting, the invention provides a general method and apparatus for narrowing and widening irrespective of the type of fabric. By leaving the number of knitting needles fixed, the invention can also be said to provide a new method and apparatus for circular knitting flat rather than tubular fabrics. Accordingly, the description to follow is intended to teach these and possibly other as yet unknown applications.

*Needle butt cams and jacks*

Reference is first made to FIGURE 1 in which there is illustrated an arrangement of needles, jacks and cams for employing the invention in the previously referred to fifty-two needle machine. The needles are provided with latches 31 and hooks 32 and alternate between having a short needle butt as at 33 and a long needle butt as at 34. The position of each needle is primarily controlled through cam action on the mentioned needle butts and this is particularly true in all phases of knitting the sock except for the heel and toe portion where certain of the needles are controlled both by needle butts and jack butts. In the example being used, the twenty-four needles indicated by the numbers 35 through 58 are each associated with a lifting jack as indicated by the numbers 60 through 83. Each of the jacks 60 through 83 is in turn equipped with a predetermined array of short and/or long jack butts chosen from a possible eight jack levels. For example, a short jack butt is indicated at 90; a long jack butt is indicated at 91; a jack having only short jack butts is illustrated by jack 60; a jack having only long jack butts is illustrated by jack 68 and a jack having both long and short butts is illustrated by jack 64. Further mention will be made of the manner in which the needle and jack butts are manipulated as the description proceeds. It should be understood that in describing FIGURE 1, the needles are assumed to be moving from left to right or in counter-clockwise direction as one looks down on the needle circle, and that the needle and jack butt cams are being viewed from outside the cylinder looking toward the inside of the cylinder.

The invention utilizes conventional sinkers which will be seen in connection with some of the other figures to be described but are not otherwise shown in detail in the drawings since the same are well understood in the art. Associated with the sinkers is a sinker cam schematically indicated at 100 wherein the straight tracks at 101, 102 and 103 indicate locations where the sinkers are pushed in towards the center of the knitting circle whereas the tracks indicated at 104, 105 indicate where the sinkers are pulled out from the knitting circle during stitching. The general operation of the sinkers and sinker cam employed with the invention is of a conventional nature and its relation to the overall invention will be better understood as the description proceeds.

In the embodiment illustrated by the drawings, there are two sets of cams namely those which act on or support the needle butts and others which act on the jack butts. Reference will first be made to the needle butt cams with respect to which 110, in dotted lines, represents a movable booster cam of conventional construction which is employed during the leg and foot but not during the heel and toe portions with which the invention is primarily concerned. While not shown, it should be understood that cam 110 is controlled so as to be made inactive during knitting of the heel and toe, controlled cams of this kind being well known in the art. When employed in the leg and foot, cam 110 acts on all of the needle butts and moves them to the needle butt level indicated at 111. Fixed needle butt cams 112, 113 and 114 constitute a substantially conventional group of cams found in circular knitting machines in which cam 112 is referred to herein as the front stitch cam, cam 113 as the center cam and cam 114 as the back stitch cam. As indicated in FIGURE 1, cam 112 receives the needle butts either at level 115 or level 111 and directs them to the respective needle butt levels 116 or 117. Since cam 110 is not employed during the heel and toe knitting it will be appreciated that the needle butt levels 111 and 115 are established by action of the jack butts later described. The needle butt level 117 represents the level associated with the inactive needles and indicates the level at which those needle butts not associated with jacks remain during the heel and toe knitting. At this same needle butt level 117, the needle butts override needle butt supporting cams 118 and 119. Any needles dropped during narrowing join the inactive group and are positioned so as to have their needle butts move at the level 117.

To continue the explanation of the needle butt cams, reference is next made to the movable split cam generally designated by the numeral 120 and having an upper cam section 121 and a lower cam section 122, and to the fixed draw down cam 123. As indicated in FIGURE 1, cam 120 receives the needle butts at either level 124 or 125 and raises the needle butts to, respectively, either level 126 or level 127. Those needles brought to level 126 will be acted on by cam 123 and brought down to level 127. Cam 120 is utilized only during the heel and toe formations and is therefore arranged to be movable as previously indicated. While cams 120 and 123 may take any of several forms to accomplish the lifting effects indicated in FIGURE 1, a construction such as that indicated in FIGURES 2 and 3 has been found useful. In these figures, movable cam 120 and fixed cam 123 are shown mounted in a common cam block 130 in which cam 123 is relatively permanently fixed and cam 120 is adapted to be slidably withdrawn by a suitable control wire indicated at 131 leading to a suitable control point such as a control drum, chain or pattern drum, not shown, so as to allow cam 120 to be operative only during the heel and toe constructions. Block 130 is fixed to the machine frame as generally indicated by base member 132 and during employment of cam 120 in the heel and toe constructions, a spring 133 assists in holding cam 120 in position adjacent the cylinder indicated at 134.

To complete the description of the needle butt cams, reference is next made to a movable raise cam 140 which is employed only during makeup for the purpose of raising the needles having long butts as at 34 to take elastic. Since this cam is not directly concerned with the invention and is furthermore of conventional construction and function no further explanation is deemed necessary. The last needle butt cam in FIGURE 1 is the draw down cam 141 whose purpose is to receive those needle butts arriving at cam 141 at level 127 and bring them down to level 117 preparatory to repeating the cycle.

Jack butt cams

Thus far we have made reference to the needles, the needle butts, the jacks and jack butts and the needle cams. We will now turn our attention to those cams which act on the jack butts and these consist primarily of two sets of eight level jack butt selectors generally indicated at 150 and 151 supplemented by a fixed jack butt raise leveling cam 152 located just prior to the jack butt selector set 150, a fixed jack butt raise leveling cam 153 located just prior to that jack butt selector set 151 and a fixed draw down jack leveling cam 154. The jack butt selector sets are, in general, conventional as to their construction and operation except for certain important features which will be dealt with. As to the general features which are well known in the art, such as the ratcheting mechanism for indexing the jack selector control drums, the control drum construction and the like, no detailed explanation is given and reference is made, for example, to Patent 2,217,022 for a general showing of jack butt selectors of the kind that may be employed with this invention.

An explanation will be made of the jack butt selector set 150 and particularly as to how it differs from the conventional jack butt selector and from this will be understood the operation of jack butt selector 151 since the two jack butt selector sets are alike in their general operation. As to selector set 150, it will be noticed that eight movable selector cams numbered 155 though 162 are provided and these work on the respective eight levels of jack butts indicated at the top of FIGURE 1. Each of the selector cams is pulled in and out by conventional mechanism such as the rocket arm 165, schematically shown in FIGURE 4, operated off the selector drum pattern disc indicated at 166. Control of the rocker arm and consequently of the selector cam generally indicated at 167 is obtained by either leaving in the pattern drum butt as at 168 or by removing it as at 169 so as to obtain respectively withdrawal or insertion of the selector cam. In order to maintain tight engagement between the rocker arm 165 and the disc 166 it is desirable to put the cam under spring tension as by the spring 170 connected between the cam and a fixed point on the frame represented at 171.

It will be noticed from FIGURES 4 and 5 that the selector cams employed in this invention are adapted to select between long and short jack butts and this is accomplished by cutting out the upper portion of each cam as shown at 175. When the jack butt cam is in active position, long jack butts in engagement with the particular cam will ride along the full width of the cam and will raise the needles associated with such long jack butts to maximum raising level as at needle butt level 111 in FIGURE 1 whereas the short jack butts will pass through the jack butt cam after reaching the cut-away portion 175 resulting in the needles associated with such short jack butts being raised to a lower level as represented by needle butt level 115 in FIGURE 1. Looking particularly at FIGURE 5, the long jack butt 176 shown in engagement with the cam will be carried to the maximum lifting height of the cam whereas if the short jack butt 177 were in engagement, it would only be raised part way up the cam and would pass through the cut-away portion 175. As related to FIGURE 1, the cut-away portion 175 in each of the jack selector cams is indicated by dashed lines such as that at 178.

The jack butt selectors will be discussed further later in the description and at this point in the description it seems sufficient to say that each of the jack butt selector cams is movable and individually controllable and when in contact with a long jack butt will raise such butt to the full height of the cam and when in contact with a short jack butt will raise such butt only part way of the cam until such short jack butt clears through the cut-away portion 175 of the cam. It is also pointed out here that the number of jack butt levels employed will vary with the number of needle changes that have to be made. In one use of the invention in a coarse gauge sock for example, it has been found practical to employ only seven levels whereas in fine gauge work, jack butt selector sets having a substantially higher number of levels will be required since more steps of dropping and adding needles are involved.

Special heel-toe yarn feed

Attention will now be given to those aspects of the invention concerned with feeding the yarn which is employed in knitting the heel and toe and in rotating the yarn feed so employed from a first position to a second position and back to the first position during each rotation of the cylinder so as to be able to knit in such yarn twice on each rotation while maintaining continuous rotation of the cylinder. After discussing the yarn feed apparatus and particularly the manner in which it is constructed, I will discuss the manner in which the yarn feed operates in conjunction with the various needle and jack positioning devices previously discussed in connection with FIGURE 1. It should be noted that the apparatus of the invention preferably operates only during heel and toe knitting and is used in conjunction with conventional apparatus which knits the remainder of the sock. The explanation given thus far and the explanation to follow therefore deals in detail only with apparatus and method employed during knitting of the heel and toe.

Referring next to FIGURE 6, the conventional high, low and idle speed drive pulleys are indicated generally at 190. According to practices well known in the art pulleys 190 rotate freely on shaft 191 whereas shaft 191 is fixedly connected to bevel gear 192 so that bevel gear 192 and accordingly cylinder 134 will turn whenever shaft 191 turns. The connection means between the particular drive pulley selected from the group indicated at 190 and the shaft 191 is not shown in detail but is typically made through pinion gears rotatably mounted on shaft 191, a clutch and clutch shifting mechanism operated from the main pattern drum. With the clutch shifted in one direction, the shaft 191 is driven through the so-called 104 tooth gear, not shown, in a purely rotary motion and with the clutch shifted in the opposite direction, the shaft is driven through the quadrant gear, also not shown, in a reciprocatory motion. Patents 933,433 and 2,217,022 may be referred to for a more detailed description of the conventional drive. In FIG-URE 6, 194 represents the pinion gear customarily driven by the quadrant gear; 195 represents the pinion gear customarily employed to drive the 104 tooth gear; 196 represents the clutch and 197 represents the clutch shifting lever. Since this invention eliminates the need for the clutch shifting mechanism, not shown, the clutch shifting lever 197 is disconnected from the clutch shifting mechanism and is secured to the frame represented at 198 by a suitable bracket 199 so as to remain in permanent engagement with the pinion gear 195 which drives the 104 tooth gear. That is, the clutch is permanently engaged for rotation since one of the very important advantages of the invention is the fact that shaft 191 is never required to reciprocate which eliminates the need for the clutch and the related clutch shifting mechanism previously referred to.

The idea of permanently locking the clutch in that position which gives the cylinder continuous rotation makes the invention easily adaptable to conventional machines. For new machines it will be appreciated that this aspect of the invention can be carried out by eliminating the clutch mechanism entirely and securing gear 195 to shaft 191 so that they rotate together as an integral unit.

As cylinder 134 turns, a sprocket gear 200 mounted on the cylinder immediately below and parallel to bevel gear 193 also turns at the speed of the cylinder and through a chain 201 drives a sprocket gear 202 which is fixed to a shaft 203 and causes this shaft to turn at the speed of the cylinder 134. Mounted at the opposite upper end of shaft 203 is a further sprocket gear 204 which is fixed to shaft 203 and which through a chain 205 drives a sprocket gear 206 fixed to a shaft 207 whose axis coincides with the central vertical axis of cylinder 134. Shaft 207 is thereby caused to rotate at the speed of the cylinder 134. Support for sprockets 204 and 206 is supplied by a cast housing having an upper portion shaped as indicated by the dotted lines 210 and which is secured to a lower tubular section, indicated by the dotted lines 211 that encloses shaft 203 and is secured to the frame, not shown, to one side of the cylinder 134. Sprockets 205 and 206 are provided with suitable bearing plates, not shown, which slide on bearing surfaces, not shown, in the upper casting 210. Practices for drives of this kind for other purposes are well known among those skilled in the mechanical and knitting arts and the same is therefor not shown in further detail. A drive generally similar is frequently employed, for example, to drive the dial at cylinder speed in a dial and cylinder knitting machine. A similar drive for intermittently driving a yarn feed at the edge of the cylinder has also been employed in a Banner wrap machine. The novelty in applying this form of drive to the yarn feed of the invention will become more apparent as I proceed further in the description.

Secured to sprocket 206 by means of pins 215 is a circular plate 216 which rotates with and in a plane parallel to sprocket 206 at the speed of cylinder 134 and mounts a pair of cone holding pins 217 on one of which is mounted a cone of yarn 218 from which is fed the yarn 219 used in knitting the heel and toe. Mounted directly above plate 216 is a further circular plate 225 on which is mounted conventional yarn tensioning apparatus generally indicated at 226. Plate 225 is secured to plate 216 by means of a tubular member 227 through which shaft 207 passes. Like plate 216, plate 225 turns at the speed of the cylinder 134 so as to move the yarn supply cone 218 and the tensioning apparatus 226 in unison with the sprocket gear 206. As indicated in FIGURE 6, it will be noticed that yarn 219 passes through plate 225 at guide 230, through plate 216 at guide 231 and through sprocket gear 206 until it appears below the sprocket gear 206 as indicated at 219'.

As will be appreciated more fully from the later description, it is necessary to provide means for lifting shaft 207 vertically when knitting is taking place in other than the heel and toe. For this purpose, a slotted collar 235 is fixed to shaft 207 and riding within the slot of collar 235 is a bar member 236 which pivots on a rod 237 mounted in a rocker arm 238. Arm 238 is pivotally supported in turn by a yoke member 239 mounted on a support rod 240 fixed to the frame as indicated at 241. The position of collar 235 is determined by a control drum 250 which controls the position of a rocker arm 251 to which is connected a control rod 252 that fastens at its upper end to the previously mentioned arm 238. Shaft 207 is therefore raised and lowered by action of control drum 250.

When shaft 207 is moved vertically, hub 255 secured to the top of shaft 207 will assume the dotted line position indicated at 255'. In moving shaft 207 it is desirable not to change the vertical position of the assembly which includes the sprocket gear 206, the plate 216 and the plate 225 and for this reason the shaft 207 is equipped with a spline, not shown, and the sprocket gear 206 is secured to shaft 207 through a key, not shown, which slides in the spline as shaft 207 changes its vertical position. Thus, shaft 207 can change vertical position without disturbing the vertical position of plates 216 and 225.

Reference is next made to FIGURES 8, 9 and 10. Collar 235 is seen to be equipped with a series of guide holes as at 260 enabling yarn 219 to be passed through collar 235 to other yarn guides to be described. Secured to the end of shaft 207 is a thin circular plate 265 which during formation of the heel and toe resides just above the sock being knit and revolves with shaft 207 at the speed of the cylinder 134. A special release arm 266 is secured to plate 265 by means of a pair of screws 267 so as to revolve with plate 265. The shape of arm 266 is preferably as shown in perspective in FIGURE 10 and in both plan and perspective in other figures to be later described. Immediately above plate 265, shaft 207 passes through a hollow hub 270 which loosely rests on plate 265 and in which shaft 207 is free to rotate. That is hub 270 may be held relatively fixed while shaft 207 and plate 265, to which shaft 207 is fixed, continue to rotate. Integral with hub 270 is a horizontally disposed plate member 271 on which is mounted a vertical pin 272 and a yarn feed guide 273 secured to plate 271 by screws 274. From the description, it will be seen that any restraining force placed against pin 272 will act to restrain yarn feed guide 273 while leaving shaft 207 free to rotate within hub 270.

Connection is made between hub 270 and collar 235 by means of a spring 280 coiled around shaft 207 and secured at one end to collar 235 by screw 281, shown in FIGURE 8, and at the other end to hub 270 by means of screw 282, shown in FIGURE 9 and later figures. So long as pin 272 is not restrained, hub 270 and consequently yarn feed guide 273 will revolve at the speed of cylinder 134 due to the connection made by spring 280. Such freedom of movement of hub 270 is the condition which prevails when not knitting in the heel and toe whereas when knitting in the heel and toe, it will be seen from this and the description following that pin 272 is alternately held and released resulting in spring 280 being alternately put in tension and then freed from tension. Each time pin 272 is released, yarn feed guide 283 is released and almost instantaneously traverses a major portion of the knitting circle. To better understand this part of the invention, the description now proceeds to the apparatus involved in holding and releasing pin 272.

The referred to holding and release mechanism includes a release bar 285, the bottom of which is formed to include a nib 286. Bar 285 is slidably mounted in a block 287 secured to the sinker cap 288. A spring 289 having one end secured to bar 285 and the other to block 287, constantly urges bar 285 towards the center of the knitting circle. Two forms of control are asserted over bar 285. When out of the heel and toe it is desirable to have bar 285 withdrawn so as not to restrict the rotation of pin 272 and also for the purpose of allowing plate 265 to be lifted vertically with shaft 207. FIGURE 11 illustrates the relative position of plate 265 and bar 285 when out of the heel and toe, with plate 265 and shaft 207 raised and bar 285 withdrawn. The withdrawal of bar 285 in this situation is accomplished by means of the control wire 290, indicated in FIGURE 6 and other figures, which is housed in a flexible conduit 291 clamped to the frame as at 292 and which leads to a control rocker lever 293 to which wire 290 is clamped and which is operated off a drum 294. That is, as the knitting progresses, drum 294 rotates by steps in the conventional manner and allows bar 285 to be inserted during the heel and toe operations and to be withdrawn during other portions of the sock knitting. The foregoing description thus describes one form of control asserted on the position of bar 285.

A second form of control is asserted on bar 285 during knitting of the heel and toe and this arises out of the tendency of release arm 266 to strike the nib 286 on each rotation and push bar 285 back so as to release pin 272 which would otherwise be restrained by bar 285. Since both control wire 290 and conduit 291 are flexible they offer relatively little opposition to the force of arm 266. Any substitute form of control should take this into account. The action being described can be seen by making reference particularly to FIGURE 8, FIGURE 13, FIGURE 14 and FIGURE 15. Remembering that plate 265 and release arm 266 are free to rotate independent of hub 270, FIGURE 8 shows one position of the apparatus in which pin 272 is seen being held by bar 285 while release arm 266 approaches. Next as shown in FIGURE 13 the tip of release arm 266 will approach the inside vertical surface of nib 286 as at 295 and will engage and push against this surface as in FIGURE 14 and finally will continue this action as in FIGURE 15 sufficient to completely release pin 272. At this point spring 280 is under tension since screw 281 has revolved while screw 282 has been held stationary. Upon the release of pin 272, the entire assembly including hub 270, plate 271, pin 272 and yarn feed guide 273 will almost instantaneously be rotated around a major portion of the knitting circle at a speed exceeding the speed of the cylinder and needles. In the course of this movement tension in spring 280 is removed and at the end of the traverse the referred to assembly starts moving at the speed of the cylinder.

From the foregoing explanation, it will be seen that by treating the position in which the yarn feed guide 273 is restrained as a first yarn feed position and the later position to which the yarn feed guide 273 almost instantaneously moves after pin 272 is released, as a second yarn feed position, the invention provides for moving the yarn feed position on each rotation such that the same strand of yarn can be fed to a plurality of separate knitting points on each rotation of the cylinder. Before proceeding further in the discussion, it might again be pointed out here that each time pin 272 is released by the forcing out of bar 285, it will first move almost instantaneously to its second position and then at the speed of the cylinder will continue rotating and will return to the first position and again be restrained by bar 285 until again released by the action of release arm 266. During this period of restraint of pin 272, spring 280 is placed under tension and this tension is what causes yarn feed guide 273 to greatly exceed the cylinder speed immediately after each release of pin 272. The relation of this yarn movement and the needle positioning will be discussed later and at this point it is desired to briefly discuss the conventional yarn feed and its relation to the heel-toe yarn feed.

Conventional yarn feed

Immediately prior to employment in the heel and toe of the apparatus with which this invention is concerned, it should be understood that the sock may be knit on conventional apparatus and in FIGURE 16 for purposes of illustration, the heel and toe yarn feed apparatus has been removed in order to see the conventional yarn feed apparatus. This latter apparatus includes a conventional yarn feed arm 300 which normally feeds the body yarn 301 to the needles as at 302 and which includes a control wire 303 and control drum, not shown, enabling feed arm 300 to be withdrawn during knitting of the heel and toe as shown in FIGURE 17. The conventional yarn feeding apparatus also includes an elastic feed arm indicated at 304, an elastic yarn 305 and suitable yarn cutting and holding means generally represented at 306.

Since apparatus employed with this invention may be conventional so far as the body and elastic feeds and yarns are concerned, the same are not considered in further detail. That is, once the invention is understood by those skilled in the art so far as its application to heel and toe knitting is concerned, it is believed that persons skilled in the art will be able to operate the apparatus of the invention with any of the several well known forms of conventional feeds employed to supply yarn during knitting on circular hosiery machines. In general, the elastic feed 304 is only employed during makeup and at such time occupies the position relative to the cams indicated in FIGURE 1. The regular yarn feed 300 when out of the heel and toe occupies the position relative to the cams indicated in FIGURE 1 and the physical position shown in FIGURE 16. When knitting in the heel and toe both body and elastic yarns are withdrawn since at such time the heel and toe yarn is fed solely from the separate cone supply represented by cone 218, the body yarn 301 being fed from fixed cone 307.

Operation of invention

Reference will now be made to the manner in which the invention performs during knitting of the heel and toe. Before getting into this explanation, it seems desirable to make certain general observations which should make the explanation to follow easier to understand. The first observation is that unlike the prior art, the present invention does not require the use of narrowing and widening picks during the heel and toe knitting. In the example being described the needles employed during narrowing and widening and the selection of the needles to be employed at particular courses of the heel and toe is controlled entirely by the jack butt selector sets 150 and 151 shown in FIGURE 1. The second observation is that during knitting of the heel and toe, the invention provides for a special rotating yarn supply as represented by cone 218 and a special rotating yarn feed as represented by yarn feed guide 273 to be employed. A further observation to be kept in mind is that feed guide 273 assumes a first position in which it feeds yarn to the needles in the manner shown in FIGURE 18 and each time after being released from the tension of spring 280 assumes a second position during the course of which feed guide 273 casts yarn around the needles as in FIGURE 19. A final observation to be made at this point is that stitching takes place after the needles receive yarn at the first position and before the needles reach the second position. Stitching also takes place after the needles receive yarn at the second position and before they return to the first position so that it can be said that in each rotation of the cylinder those needles being employed in the heel and toe knitting receive and knit the same yarn twice. Another way to express this is to say that the needles which take the yarn twice knit two courses on each rotation.

To summarize then what is now to be explained in detail in reference to the heel and toe knitting, the invention provides for a special yarn feed to drop into place during heel and toe knitting from which first point yarn is fed to needles selected by the jack butt selectors and such yarn is then knit. The yarn is then rapidly moved at a speed exceeding the speed of the cylinder to a second point so as to cause the same yarn to be cast again around the needles involved after which the yarn is again knit while the yarn feed proceeds to return to the first point. The process is repeated and continued while needles are being withdrawn and added by the jack butt selector sets until the narrowing and widening courses are completed after which the special yarn feed is removed from operation and knitting continues normally as in the leg and foot portions of the sock.

Now to get into the detailed operation, it will be assumed that the top and leg are near completion and that we are ready to commence the heel. At this point in time the regular yarn feed 300 will be engaged as in FIGURE 16. The shaft 207 and the plate 265 will be revolving idly above the knitting circle at the speed of cylinder 134 as in FIGURE 11. Spring 280 will be free of tension and plate 271 will be revolving at the same speed. Strand 219 at this point will be running roughly parallel to the axis of shaft 207 as in FIGURE 6, through yarn guide 310 as in FIGURE 11 to yarn feed giude 273 and then into the knitted fabric where yarn 219 was last employed. As to handling yarn 219, I am aware that the apparatus could be devised to cut and hold yarn 219 by conventional cut and hold mechanism as at 306 each time after it has been used. However, I have found it to be satisfactory to simply cut the heel and toe yarn surplus after the finished work has been removed from the machine and during the course of other finishing operations. Therefore, the apparatus of my invention does not provide for cutting yarn 219 on the machine though it could so provide.

To continue, the collar 235 at this point be raised due to rocker arm 251 being on a high portion of drum 250 which in turn will result in the entire heel-toe yarn feed assembly being raised as in FIGURE 11. At the same time bar 285 will be withdrawn due to rocker arm 293 being on a high portion of drum 294. Also at this time, cam 110 is engaged, jack butt selector sets 150 and 151 are entirely disengaged, split cam 120 is disengaged and cam 140 is disengaged. Cam 140, it might be noted, is only employed during make-up to select between the long and short butt needles for purpose of taking elastic and therefore would in fact have been disengaged upon completion of the make-up courses. In summary, with the various elements in the state described the machine is just ready to go into knitting of the heel and toe.

Several changes in the state of the elements are effected almost simultaneously. Shaft 207 is allowed to drop vertically and this is effected by drum 250 moving so as to allow rocker arm 251 to ride on a low portion of drum 250 which allows collar 235 to drop. At about the same time bar 285 is moved inwardly by the effect of spring 289 and the fact of rocker arm 293 moving on a low portion of control drum 294. Also at this time jack butt selector sets 150 and 151 will be engaged by their respecive control drums, not shown, so as to cause jack butt cams 162 and 315 respectively to engage. Cam 110 will be withdrawn at this same time and cam 120 will be engaged. I would like to point out here that the knitting machine of this invention will be found to be no different from any other knitting mbachine in that the timing must be precise and must be adjusted to the particular kind of control drums, cams and the like employed. What is being attempted here is to state what the general timing problem is so that anyone skilled in the art will be able to adapt the invention to their own particular machine and its particular conditions. The exact timing will vary from machine to machine.

Continuing with this phase of the description, bar 285 will now hold pin 272 and prevent it from turning, yarn feed guide 273 will begin to feed yarn to the needles selected as mentioned, those needles having short jack butts at the lowermost jack level will move to needle butt level 115 and will take yarn 219 but will not shed the regular yarn previously taken whereas those needles selected with lonk jack butts at the lowermost jack level will be raised to needle butt level 116 which causes them to both shed the previous yarn and take yarn 219. Since the selected needles will at this point be taking the yarn 219, the regular yarn feed 300 can be raised however I have found it desirable to overlap and feed both yarns to two or three needles before raising the regular yarn feed 300 and I have timed the control to cause this overlap. Therefore, as soon as these few leading needles have received yarn from both sources the conventional drum control, not shown, for regular yarn feed 300 will operate to cause this feed to withdraw and the regular yarn 301 to be cut and held by the holding and cutting mechanism 306. During this time the needles which have been selected by jack butt selector set 150 will, prior to reaching jack butt selector set 151, all be brought down to needle butt level 117 at the bottom of cam 114 and in the course of moving from selector set 150 to selector set 151 will have the long jack butt needles acted on by cams 112, 113 and 114 and the needles with short jack butt needles acted on only by cam 112. Reference is made back to FIGURE 5 for the manner in which selection is made between the long and short jack butts.

Figure 21:
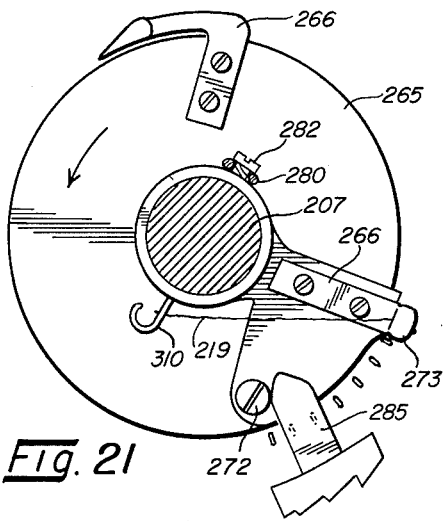

Leaving the cam and jack butt action for a moment, attention is next given to FIGURES 20 through 24 for a study of what is taking place with respect to the relative positions of the needles being employed, the release arm 266, the yarn feed guide 273, the pin 272 and the bar 285. At the moment shaft 207 is lowered and the heel-toe yarn feed goes into action, the relative positions of these elements will be approximately that indicated in FIGURE 20 with the needles having jacks being positioned as generally indicated at 315. Bar 285 is engaged and is holding pin 272. Yarn feed guide 273 is held in its first position and release arm 266 is just beginning to move away from guide 273. In FIGURE 21, the first needle selection has been assumed to have been effected at the jack butt selector set 150 and the needles selected are taking yarn in the maner depicted in FIGURE 18. Notice here that release arm 266 has now left yarn feed guide 273 and with shaft 207, collar 235, plate 265, plate 216, and plate 225 will continue to turn at the speed of cylinder 134. Spring 280 will now begin to be tensioned and the yarn 219 will begin to be twisted around shaft 207 between collar 235 and hub 270 as seen in FIGURE 8.

Figure 22:
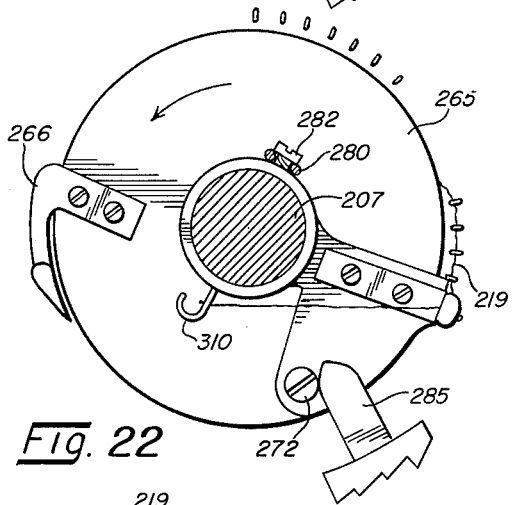

In FIGURE 22, the selected needles have cleared the yarn feed guide 273 and the release arm 266 is approaching pin 272. At this point in time, some of the needles will also have cleared the knitting station represented by cam 114 and will be passing through the jack butt selector set 151, which in the manner of jack butt selector set 150 will select the requisite needles after which the needle butts of the selected needles having short jack butts will ride over cam 122 while those having long jack butts will ride over cam 121. All of the selected needles will be brought to yarn taking level but only the long butt needles will have shed the yarn previously taken due to the long and short jack butt action described. In regard to such jack butt selection, it will be noticed in FIGURE 1 that the jack butts on the outside of each level of jack butts are designated as short jack butts. The reason for having short and long jack butts and for providing cams which select between the long and short jack butts is that I have found that a much neater and more close knit gore is accomplished when the yarn is held on the outside needles in this manner though the invention is entirely operable with all of the jack butts being formed as long butts.

Figure 23:
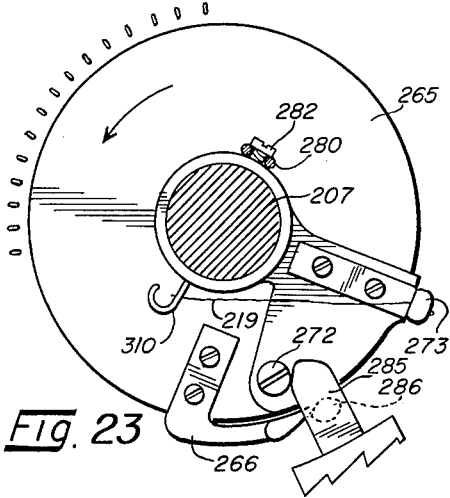
Figure 24:
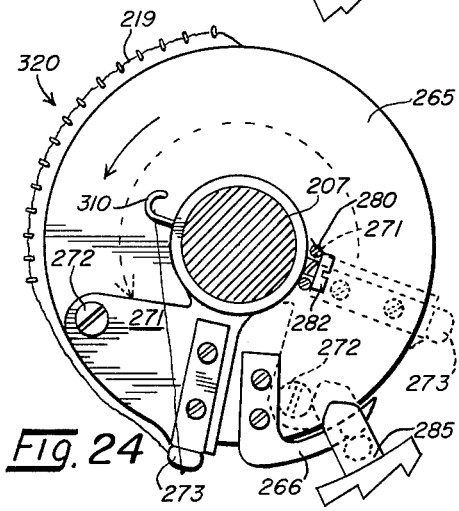
Figure 19:
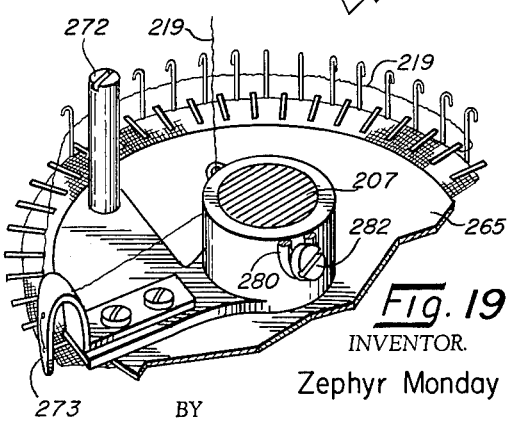
FIGURE 19 is an enlarged fragmentary perspective detail showing how the needles appear after they have received yarn from the heel-toe yarn feed guide in its second position.

Giving our attention now to FIGURE 23, release arm 266 can be seen to be just approaching nib 286 and will now go through the process of causing bar 285 to withdraw in the manner previously described in more detail in FIGURES 13 through 15. Looking next at FIGURE 24, the relative positions of pin 272, release arm 266, yarn feed guide 273 and bar 285 at the instant of release is shown in dotted lines. Their respective positions at the instant after release is shown in heavy lines. The needles selected at this time are positioned as indicated at 320. In the process of moving from the dotted line position shown in FIGURE 24, this position also being approximately the position illustrated by FIGURE 8, to the solid line position of FIGURE 24 the yarn 219 will be cast over the selected needles as best illustrated in FIGURE 19. It should be especially appreciated at this point in the discussion that due to the tension of spring 280, the motion of yarn feed guide 273 is almost instantaneous and is effected at a speed that greatly exceeds the speed of the cylinder 134. That is, the yarn feed guide 273 moves from a position behind the selected needles to a position ahead of the selected needles while casting yarn on the needles and while the needles continue to rotate at the cylinder speed. So far as is known this feeding concept is entirely unique in the art and contributes substantially to the novelty of the invention.

With the yarn cast on the needles and the tension of spring 280 released, yarn feed guide 273 will move at the speed of the cylinder and pin 272 will be brought back against bar 285 as in FIGURE 20. While this is taking place, the selected needles will be passing through the knitting station represented by cam 141 and will then present themselves for reselection at jack butt selector set 150. Depending on the number of courses to be knit between jack butt selector changes and depending on what part of the narrowing and widening is taking place the needles will be selected and will be reduced or expanded in number accordingly.

Operation of jack selector sets

Some specific explanation and comments concerning the operation of the jack butt selector sets 150 and 151 is made at this point since much of the success of utilizing the invention will depend on a full appreciation of the role of the jack butt selectors in the overall method and apparatus. In particular, it should be noted that the fabric width is controlled by the jack butt selection which means that the width can be changed as often as desired by regulating the frequency of operation of the jack butt selector sets. That is, starting with a given width of fabric on a given group of needles, the width can be rapidly changed simply by operating the jack butt selector sets at close intervals such as after every passing of the needles whereas the width of the fabric can be gradually changed by operating the jack butt selector sets at widely spaced intervals, such as after several passings of the needles between each selector change. As previously mentioned, it has also been found that the appearance of the fabric and particularly at the gores is affected by how the jack butt selection is effected. This has been previously discussed with regard to long and short jack butt selection and with regard to raising the first and last needles in each group that pass through the selectors to yarn taking position but without shedding.

The manner of locating roller cams on the 104 tooth gear and using these cams to index the jack butt selectors is well known as is the practice of keeping the jack butt selector pawls inactive at desired times. It is believed therefore that those skilled in the art will readily find various means of operating and controlling the jack butt selector sets to accomplish various results with the invention. In the example which is being used in the description, I have found one mode of operating the jack butt selector sets 150 and 151 to be preferable which it is desired to explain. In particular, the cycle of operation includes setting both jack butt selector sets to a given level of selection and passing the needles through both jack butt selector sets without any changes being made in either. Before the needles come back on the next rotation, jack butt selector 150 is left as it was but jack butt selector 151 is changed to its next level selection. Then the needles are passed through both selectors after which jack butt selector set 150 is changed to its next level selection. Then the needles make a further pass through both selector sets without further changes. Before the next pass jack butt selector 151 is changed and then before the following pass jack butt selector 150 is changed and then as before the next pass is without any selector change. Such sequence continues until the desired narrowing and widening is completed.

Summary

So far as I am aware, I am the first to propose for a circular knitting machine having a rotating needle cylinder, the possibility of feeding yarn through a feed which is capable of a delayed but complete rotation on each rotation of the cylinder so as to effect taking and knitting of such yarn at more than one position in each rotation of the cylinder. While others have proposed continuous rotation of the cylinder during knitting of the heel and toe by various means of floating the yarns, I believe I am also the first to propose a method which enables the heel and toe to be knitted with continuous rotation of the cylinder without requiring floating of the threads.

It is also pointed out in summary as will be apparent to those skilled in the art that a particular group of needles could be selected and held for a substantially infinite number of courses with no intervening needle selection and in this way use the invention simply as a means of knitting a flat fabric on a circular knitting machine. Having pointed the way in what is believed to be a basic contribution to the art, it is realized that those skilled in the art will very rapidly conceive of different and perhaps better ways of delaying and moving the yarn feed and of controlling the needle positions and other changes but without departing from the scope and spirit of the invention as defined in the claims.

What I claim is:

1. In a circular knitting machine the combination of a cylinder, means for maintaining said cylinder in continuous rotation, needles mounted in said cylinder and revolving at the speed thereof, a yarn feed, means mounting said feed and revolvable about the central axis of said cylinder, means for restraining said feed mounting means from revolving for predetermined times during each rotation of said cylinder; spring means adapted to place said mounting means under increasing spring tension while being restrained, means to release said restraining means at predetermined times whereby to cause said yarn feed to be released and moved in the direction of and at a speed in excess of the speed of said needles so that the same said yarn may be fed and knit at a plurality of successive stations on each rotation of said cylinder.

2. In a circular knitting machine the combination of a cylinder, needles mounted in said cylinder, means for maintaining said cylinder in continuous rotation, a plurality of yarn taking and knitting stations arranged to be encountered by said needles on each rotation of said cylinder, selector means at each of said stations operable to select needles for yarn taking, a shaft having a terminal end in the knitting circle and revolvable about an axis above and coinciding with the axis of said cylinder, means driving said shaft at the speed of said cylinder, hub means loosely mounted on said terminal end and revolvable about said shaft, a spring coiled about said shaft and connected at its upper end to means integral with said shaft and at its lower end to said hub means whereby to cause said hub means to tend to revolve at the speed of said cylinder, yarn feeding means mounted on and movable with said hub means, restraining means operable to restrain motion of said hub means at certain of said stations and thereby cause tensioning of said spring, release means fixed to said terminal end and movable therewith at the speed of said cylinder and engageable with said restraining means to release said hub means from said tensioning, said release resulting in said yarn feeding means being moved to the next successive station in the direction of and at a speed in excess of the needles and in the course thereof casting the same said yarn on the needles selected at said station.

3. A method of knitting a sock in a circular knitting machine including continuously rotating the cylinder throughout the knitting of said sock; holding stationary the yarn supply and yarn feed utilized during knitting of the top, leg and foot portions of said sock; and then during the knitting of the heel and toe portions of said sock continuously rotating the yarn supply being utilized at the speed of said cylinder and intermittently rotating the yarn feed being utilized at times in excess of and at other times at the speed of said cylinder whereby to enable said sock to be knit throughout with continuous rotation of said cylinder.

4. In a circular knitting machine the combination of a cylinder, means for maintaining said cylinder in continuous rotation, needles mounted in said cylinder and revolving at the speed thereof; a yarn feed, a plurality of successive knitting stations including knitting cams encountered in each rotation, means mounting said feed and revolvable about the central axis of said cylinder, means to periodically raise said mounting means including said yarn feed out of feeding engagement with said needles, means for restraining said feed mounting means from revolving for predetermined times during each rotation of said cylinder, coil spring means operable around an axis coinciding with the axis of said cylinder and adapted to place said mounting means under increasing spring tension while being restrained, means to release said restraining means at predetermined times comprising a member revolving at the speed of said cylinder and contacting said restraining means to effect said release whereby to cause said yarn feed to be released at such times and moved in the direction of and at a speed in excess of the speed of said needles so that the same said yarn may be fed and knit at each of said stations on each rotation of said cylinder.

5. In a circular knitting machine, a cylinder, needles mounted in said cylinder, means to continuously rotate said cylinder, two successive feeding and knitting stations located so as to be encountered in each rotation of said cylinder, a first yarn feed engageable with said needles only at the first of said stations, a first relatively fixed yarn supply adapted to feed said first yarn feed, a second yarn feed, a second yarn supply, means to continuously rotate said second supply at the speed of said cylinder and around the axis thereof, means to selectively render each of said feeds ineffective, and control means to hold said second yarn feed stationary at the first of said stations for a predetermined time and to thereafter rotate it at a speed exceeding the speed of said cylinder to the other of said stations.

6. A method of feeding a yarn to be knit into continuously successive partial courses in a circular knitting machine having a needle cylinder including continuous rotation of the cylinder, continuous engagement of the yarn with a yarn guide maintained in an operative feeding position, maintaining the yarn between said guide and the needles of said machine substantially non-floating, and with each revolution of the cylinder relative forward and substantially instantaneous movement of the yarn guide with respect to the cylinder immediately after a predetermined delay at a fixed station, such substantially instantaneous movement being through an extent sufficient to allow the yarn to be cast directly from the guide at least twice on the same needles in each revolution of the cylinder.

7. A method as claimed in claim 6 wherein said movement is at a speed not geared to the cylinder speed.

8. A method of knitting a yarn into continuously successive partial courses in a circular knitting machine having a needle cylinder including continuous rotation of the cylinder, continuous engagement of the yarn with a yarn guide maintained in an operative feeding position, and with each revolution of the cylinder relative forward and substantially instantaneous movement of the yarn guide from a first stationary stitching station by a second stationary stitching station, the movement being at a speed in excess of the speed of the cylinder whereby to enable needles fed at the first station to knit such yarn and again be fed and knit the same yarn at the second station in a second immediately successive course on each rotation of the cylinder.

9. A method of knitting a yarn into continuously successive partial courses in a circular knitting machine having a needle cylinder including continuous rotation of the cylinder, continuous engagement of the yarn with a yarn guide maintained in an operative feeding position, maintaining the yarn between said guide and the needles of said machine substantially non-floating, and in each rotation of the cylinder a rapid substantially instantaneous movement of the yarn guide from a first stationary stitching station by a second stationary stitching station whereby to enable selected needles to receive yarn from the feed and knit at both of the stations during each rotation of the cylinder.

10. A method of knitting a yarn into continuously successive partial courses in a circular knitting machine having a needle cylinder including the steps of continuously rotating the cylinder, of continuously engaging the yarn with a yarn guide maintained in an operative feeding position, maintaining the yarn between said guide and the needles of said machine substantially non-floating, of feeding yarn from the guide at a first stationary stitching station to selected needles and then immediately thereafter moving the yarn guide at a speed in excess of the rotative speed of the needles by a second stationary stitching station whereby to cause the yarn to be cast again on the needles and be knit in at the second station to form two successive partial courses all during each rotation of the cylinder.

11. A method of narrowing and widening while maintaining continuous rotation of the cylinder in a circular knitting machine including feeding a yarn from a yarn guide maintained in continuous engagement with the yarn and held continuously in operative position whereby to feed yarn on the needles selected for said narrowing and widening at a first stationary stitching station, then upon completing of the selected needles passing through such first station rapidly and substantially instantaneously moving the yarn guide forward ahead of the selected needles and prior to said selected needles passing through a second stationary stitching station whereby to cause the yarn to be cast and knit on the selected needles at both first and second stations to form continuously successive pairs of partial courses during each rotative movement of the selected needles, and changing the number of the needles in certain courses during and to effect the narrowing and widening.

12. A method of knitting successive partial courses comprising heel and toe fabric in a circular knitting machine having a needle cylinder including continuous rotation of the cylinder, selecting the needles at a first station, feeding yarn from a stationary yarn guide to the needles so selected followed by knitting at a stationary knitting station, reselecting the needles at a second station, substantially instantaneously rotating the yarn guide at a speed exceeding the speed of the needles so as to bring the yarn guide ahead of, and to cast the same yarn on, the reselected needles followed by knitting at a second stationary knitting station and rotation of the yarn guide substantially at the speed of the needles back to where it was first stationary preparatory to repeating the cycle on each rotation of the cylinder.

13. The method of knitting a yarn into successive partial courses in a circular knitting machine having a needle cylinder including continuous rotation of the cylinder, continuous engagment of the yarn with a yarn guide held in operative feeding position, on each rotation positioning selected needles for taking, stitching and shedding yarn at a first stationary knitting station and repeating such positioning prior to any float formation and at least once at a different stationary knitting station forwardly removed from the first and rotatively moving the yarn guide in the direction of cylinder rotation and in time coordination with such needles reaching such stations whereby to enable the feeding and knitting of the same yarn at each such station.

14. A method of continuous rotative knitting of a yarn into a fabric consisting of successive partial courses formed solely from said yarn employing a circular knitting machine having a needle cylinder including, continuously engaging said yarn with a yarn feed guide held throughout the forming of said fabric in operative position, periodic and substantially instantaneous rotative forward movement of the yarn guide in the direction of the cylinder rotation and on each rotation of the cylinder of the machine between a plurality of successive arcs; at each such arc selecting a group of needles and raising by means of stationary cams all but the first and last of the group to yarn shedding position, feeding to the entire group yarn from said feed, and knitting said yarn by means of stationary cams and periodically changing the number of needles selected whereby to vary the width of the fabric.

15. In a circular knitting machine having a needle cylinder the combination of a group of needles, a yarn supply, means for maintaining said needles in continuous rotation, a yarn guide held in continuous engagment with said yarn and in operative position, cam means for positioning said needles for yarn taking and knitting at successive first and second stations, means to hold said guide fixed at said first station while casting said yarn on said needles and means to thereafter release and substantially instantaneously rotatively move said guide in the direction of movement of and to an extent to enable the same said yarn to again be cast on the same needles at said second station all in the course of each rotation of said needles.

16. In a machine as claimed in claim 15 wherein said cam means is stationary.

17. In a knitting machine the combination of vertically positionable circularly arranged needles, a yarn supply, means for maintaining said needles in continuous rotation, a yarn guide held in continuous engagment with said yarn and in operative position, means mounting and tending to rotatively move said guide about the central axis of the needle circle and at the speed thereof, stationary cam means for positioning selected ones of said needles for yarn taking and knitting at a plurality of successive stationary stations in the path of each rotation of said needles, means for holding said guide mounting means fixed at certain of said stations, means for releasing said holding means and means for substantially instantaneously moving said guide mounting means upon each release thereof in the direction of and at a speed in excess of the speed of said needles, said yarn being cast on the needles selected and knit at each of said stations in each rotation of said needles.

18. In a circular knitting machine the combination of needles; a cylinder; means for maintaining said cylinder in continuous rotation; stationary needle selecting and stitching means located at a plurality of stationary stations encountered in each revolution of said cylinder; a first stationary yarn supply and first guide; a second yarn supply and second guide, said second guide when operative being in continuous engagement with yarn from said second supply and being held in operative feeding position; means enabling said first and second guides to be selectively made ineffective at predetermined times; means to continuously rotate said second supply at the speed of said cylinder; control means to hold said second guide stationary at one of said stations pending the passing therethrough of a predetermined number of said needles and to thereafter substantially instantaneously rotate said second guide at a speed exceeding the speed of said cylinder to another of said stations; means to render said control means ineffective at predetrmined times and means to render ineffective certain of said needle selecting and stitching means at predetermined times.

19. In a circular knitting machine the combination of a cylinder, independently operable needles mounted in said cylinder, jacks mounted in said cylinder below a predetermined group of successive ones of said needles; two knitting stations including jack selectors and stationary needle stitching cams at each, control means for said selectors enabling the number of needles in said group to be changed at each of said stations, a yarn supply and means to rotate said supply at the speed of said cylinder, a yarn guide fed by said supply and in continous feeding engagement with said needles, means to hold said guide at the first of said stations pending the passing of said group therethrough and to thereafter substantially instantaneously rotate it to the second of said stations at a speed exceeding the speed of said cylinder whereby to enable said yarn to be fed and knit at each of the said stations in each rotation of said cylinder.

20. In a circular kniting machine having a rotary cylinder, means to maintain said cylinder in continuous rotation, a set of independent needs therefor, a set of independent jacks therefor, a first yarn guide for feeding a first yarn supply to said needles, a second yarn supply, means adapted to support and rotate said second supply about an axis above and coinciding with the axis of said cylinder, a second yarn guide fed from said second supply, vertically adjustable means supporting said second yarn guide and adapted to engage said second guide with said needles, control means operable on on said first yarn guide and control means operable on said adjustable means enabling said needles to be fed alternatively from said first and second supplies, two knitting stations including stationary stitch cam and jack selector mechanism at each, additional control means operable during engagement of said second yarn guide to hold said second guide at the first of said stations pending passing therethrough of the needles selected for yarn taking at such station and to then substantially instantaneously rotate said second guide to the second of said stations at a speed exceeding the speed of said cylinder whereby said needles may take and knit yarn from said second supply at both of said stations on each rotation of said cylinder, and pattern mechanism operable on each said jack selector mechanism at each said station to be varied whereby to effect narrowing and widening in various courses of said knitting.

References Cited by the Examiner

UNITED STATES PATENTS

| | | | |
|---|---|---|---|
| 193,646 | 7/1877 | Fitzpatrick | 66—133 |
| 501,876 | 7/1893 | Dewees | 66—125 |
| 2,213,454 | 9/1940 | Scott | 66—134 |
| 2,278,869 | 4/1942 | Dickens | 66—134 |
| 2,775,880 | 1/1957 | Philip | 66—133 X |

(Other references on following page)

| | | UNITED STATES PATENTS | |
|---|---|---|---|
| 2,911,807 | 11/1959 | Lombardi | 66—135 X |
| 2,996,903 | 8/1961 | Levin | 66—43 |
| 3,120,115 | 2/1964 | Reymes-Cole | 66—125 |
| 3,192,741 | 7/1965 | Hanel | 66—49 |

FOREIGN PATENTS

| | | |
|---|---|---|
| 1,053,057 | 1/1954 | France. |
| 1,121,264 | 1/1962 | Germany. |
| 18,946 | 1890 | Great Britain. |
| 570,180 | 6/1945 | Great Britain. |
| 872,375 | 7/1961 | Great Britain. |
| 960,456 | 6/1964 | Great Britain. |
| 318,796 | 6/1934 | Italy. |

ROBERT R. MACKEY, *Primary Examiner.*

RUSSELL C. MADER, DONALD W. PARKER, W. C. REYNOLDS, *Assistant Examiners.*